United States Patent
Cheng

(12) 
(10) Patent No.: US 6,834,623 B2
(45) Date of Patent: Dec. 28, 2004

(54) PORTABLE HYDROGEN GENERATION USING METAL EMULSIONS

(76) Inventor: Christopher T. Cheng, 260 W. Dana St., Mountain View, CA (US) 94041

( * ) Notice: Subject to any disclaimer, the term of this patent is extended or adjusted under 35 U.S.C. 154(b) by 0 days.

(21) Appl. No.: 10/638,461

(22) Filed: Aug. 6, 2003

(65) Prior Publication Data

US 2004/0025808 A1 Feb. 12, 2004

Related U.S. Application Data

(63) Continuation-in-part of application No. 09/923,887, filed on Aug. 7, 2001, now abandoned.

(51) Int. Cl.$^7$ ................................................. F02B 43/10
(52) U.S. Cl. ................... 123/1 A; 123/3; 123/DIG. 12; 429/12; 423/644; 423/657
(58) Field of Search ................................. 123/1 A, 2, 3, 123/DIG. 12; 429/12, 13, 17, 19; 423/499.1, 629, 644, 657; 422/211; 436/144

(56) References Cited

U.S. PATENT DOCUMENTS

| | | |
|---|---|---|
| 3,683,622 A | 8/1972 | Von Krusenstierna |
| 4,155,712 A | 5/1979 | Taschek |
| 4,261,955 A | 4/1981 | Bailey, Jr. et al. |
| 4,356,163 A | 10/1982 | Davidson |
| 4,433,633 A | 2/1984 | Caudy et al. |
| 4,622,924 A | 11/1986 | Lewis |
| 4,770,764 A | 9/1988 | Ohtake et al. |
| 4,988,486 A | 1/1991 | Harris et al. |
| 5,119,768 A | 6/1992 | Russell |
| 5,293,857 A | 3/1994 | Meyer |
| 5,294,329 A | 3/1994 | Kramer |
| 5,510,201 A | 4/1996 | Werth |
| 5,514,353 A | 5/1996 | Adlhart |
| 5,593,640 A | 1/1997 | Long et al. |
| 5,690,902 A | 11/1997 | Werth |
| 5,728,464 A | 3/1998 | Checketts |
| 5,817,157 A | 10/1998 | Checketts |
| 5,830,426 A | 11/1998 | Werth |
| 6,007,699 A | 12/1999 | Cole |
| 6,221,310 B1 * | 4/2001 | Checketts et al. ............. 266/48 |
| 6,458,478 B1 * | 10/2002 | Wang et al. ................... 429/17 |
| 6,475,655 B1 * | 11/2002 | Nakanishi et al. ............ 429/19 |
| 6,783,877 B2 * | 8/2004 | Shimazu et al. .............. 429/17 |
| 2002/0037452 A1 | 3/2002 | Schmidt |
| 2003/0207161 A1 * | 11/2003 | Rusta-Sallehy et al. ........ 429/20 |
| 2004/0018632 A1 * | 1/2004 | Shabana et al. ............ 436/144 |

FOREIGN PATENT DOCUMENTS

| | | | | |
|---|---|---|---|---|
| JP | 115733 | * | 5/1996 | ........... H01M/8/06 |
| RU | 1998-566216 | * | 4/1998 | ........... C10G/27/10 |

* cited by examiner

Primary Examiner—Hai Huynh
(74) Attorney, Agent, or Firm—Intellectual Property Law Group LLP; Otto O. Lee; Juneko Jackson

(57) ABSTRACT

An embodiment of the present invention is a portable hydrogen generation system for operating a vehicle powered by either the hydrogen internal combustion engine or a fuel cell using active metals such as sodium potassium, magnesium, aluminum or iron in the form of an emulsion, and a method thereof. The emulsion comprises a metal powder pre-mixed with oil. In the case of sodium, potassium and magnesium, the metal is reacting with water at or near room temperature. However, in the case of aluminum and iron, the metal is reacting with alkali hydroxide solutions. The system is controlled and managed by a microprocessor in order to generate hydrogen on demand at or near room temperature with a very high efficiency.

23 Claims, 1 Drawing Sheet

PORTABLE HYDROGEN GENERATION USING METAL EMULSIONS

CROSS-REFERENCE

This application is a continuation-in-part application of and claims the benefit of non-provisional patent application Ser. No. 09/923,887 filed on Aug. 7, 2001, now abandoned, and is hereby incorporated by reference in its entirety.

FIELD OF INVENTION

The present invention pertains to a portable hydrogen generation system and method which can power internal combustion engines on-board vehicles such as automobiles. Furthermore, this hydrogen generation system can supply hydrogen to feed fuel cells. The fuel supplied to the portable hydrogen generation system comes in the form of an emulsion that consists of metal powder pre-mixed with oil. The metal emulsion can be precisely injected into the hydrogen generation system based on demand. The hydrogen is generated from the reactions between an alkaline metal, such as sodium and water, or the reaction between alkaline hydroxide solution and a metal such as iron or aluminum.

BACKGROUND OF THE INVENTION

It is well known that hydrogen can be used to fuel internal combustion engines or to feed fuel cells, and it has been commercially produced as a byproduct from chlorine-alkali electrolysis or through large-scale production through a steam-carbon reaction. However, hydrogen is bulky and a real challenge to store. Such an obstacle can be overcome by hydrogen generation on-situ and by on demand delivery. Some processes have been disclosed as producing hydrogen from the reaction between an alkali metal and water. However, such disclosure fails to show that metal in emulsion can facilitate metering-on-demand and precise injection into an internal combustion engine. The on demand hydrogen generation systems have been exemplified by others but show systems which do not use a metal emulsion. For instance, one particular system utilizes a membrane to separate a water container from a metal hydride or alkali metal with water slowly diffusing through the membrane to achieve a chemical reaction. However, the system is unreliable. In the case of membrane rupture, all alkali metal or metal hydride would be instantly be exposed to water and result in an uncontrollable generation of the hydrogen. This is totally unsuitable for use in automobiles and motor vehicles. Another drawback of the membrane is the possibility of membrane clog after prolonged use.

The use of hydrogen as fuel for internal combustion engines or for fuel cells to run an electric car has also been disclosed. However, there is still no teaching of the use of metal emulsions which can be metered and fed precisely on demand to the hydrogen generator and at the same time have low temperature reactions with a high rate of hydrogen generation. Some others have used hydrochloric acid to react with a pure metal to generate hydrogen. There, again no metal emulsion is involved.

In other teachings, activated iron is reacted with heated water for hydrogen generation. However, again there is no use of metal emulsion. Others seek to generate hydrogen from metal hydrides and water. The diffusion of water into metal hydride granules results in hydroxide or oxide which may result in resistance to water diffusion and an incomplete conversion of rather expensive materials. There is thus a need for complete conversion of metal to hydrogen. Another example of the in-situ-hydrogen-generation for internal combustion engines shows hydrogen generated by the reaction of non-compressed packed-iron-powder with alkaline hydroxide as a catalyst at temperatures lower than 250 degrees C. However, the quantity of iron or aluminum in emulsion form being precisely metered into the reactor and completely reacted according to the demand of the internal combustion engine, has not been observed.

Others suggest that any active material, such as sodium, may be coated with an impervious material, such as plastics or aluminum film. The pellet coating can be broken by an electrical current or a mechanical means, such as a knife, and then the sodium is exposed to water to generate hydrogen on-board of a motor vehicle. However, such inventions can only supply the fuel in large increments, due to the size of the pellets, but not continuously. In particular, some have shown reacting iron with water in the presence of an alkali hydroxide as a catalyst to generate hydrogen, then, using it to feed a fuel cell. The electricity produced is utilized to run an electric car. However, such an invention does not have the benefits of simplicity of a mechanical arrangement and the precision and continuity of metering the fuel according to the demand of the engine. In addition, neither is there a high rate of hydrogen production nor the desired lowered temperature for reactions to take place between metal emulsions and water seen in such inventions.

SUMMARY OF THE INVENTION

The principal object of the present invention is to provide a fuel for an in-situ-hydrogen-generation system using a metal emulsion that can be continuously metered and precisely fed into a reactor, in which the metal is rapidly and completely reacted with water or hydroxide solution. The hydrogen generated is used to operate an internal combustion engine or to fuel a fuel cell. The electricity generated from the fuel cell can be used to drive an electric car or other electrical devices.

Another object of the present invention is to prepare the metal fuel (finely divided iron or aluminum or alkali metals) in paste form to prevent pre-usage contamination of the metal by water vapor or oxygen in the air. The said paste (or emulsion) has a certain consistency to allow it to be fed or injected smoothly, precisely, and continuously. The metal fuel emulsion may be contained in cartridges.

Still another object of the present invention is to provide for the said hydrogen generation system, a microprocessor controlled system to orchestrate the smooth operations of the metal to hydrogen conversion. The microprocessor timely opens and closes the delivery valves of emulsion cartridges according to the operating conditions of the internal combustion engine which the hydrogen generation system serves. It also controls the supply of water (or hydroxide solution) to the reactor and the discharging of the waste reaction products.

Still another object of the present invention is to provide a stirrer for the reacting tank to promote a complete reaction between the metal powder granules and water (or hydroxide solution). Thus, the rapid reaction and the complete conversion of the metal to hydrogen are assured.

Yet, another object of the present invention is to provide for instant pure hydrogen generation using reactions at low temperatures, for instance water at or near room temperature, to react with metal fuel so as to result in a higher rate of hydrogen generation than currently observed, making it highly desirable for use with automobiles. The pure hydrogen is also preferably generated at or near room temperature.

Further, it is another embodiment of the present invention that the reaction tank of the system is kept at a constant and desirable temperature through the use of a variable speed blower to remove excess heat generated by the reaction tank.

These and other embodiments of the present invention are further made apparent, in the remainder of the present document, to those of ordinary skill in the art.

BRIEF DESCRIPTION OF THE DRAWING

In order to more fully describe objects, features and advantages of the present invention, reference is made to the accompanying drawing. This drawing is not to be considered limitations in the scope of the invention, but is merely illustrative.

DETAILED DESCRIPTION OF SPECIFIC EMBODIMENTS

Figure 1:
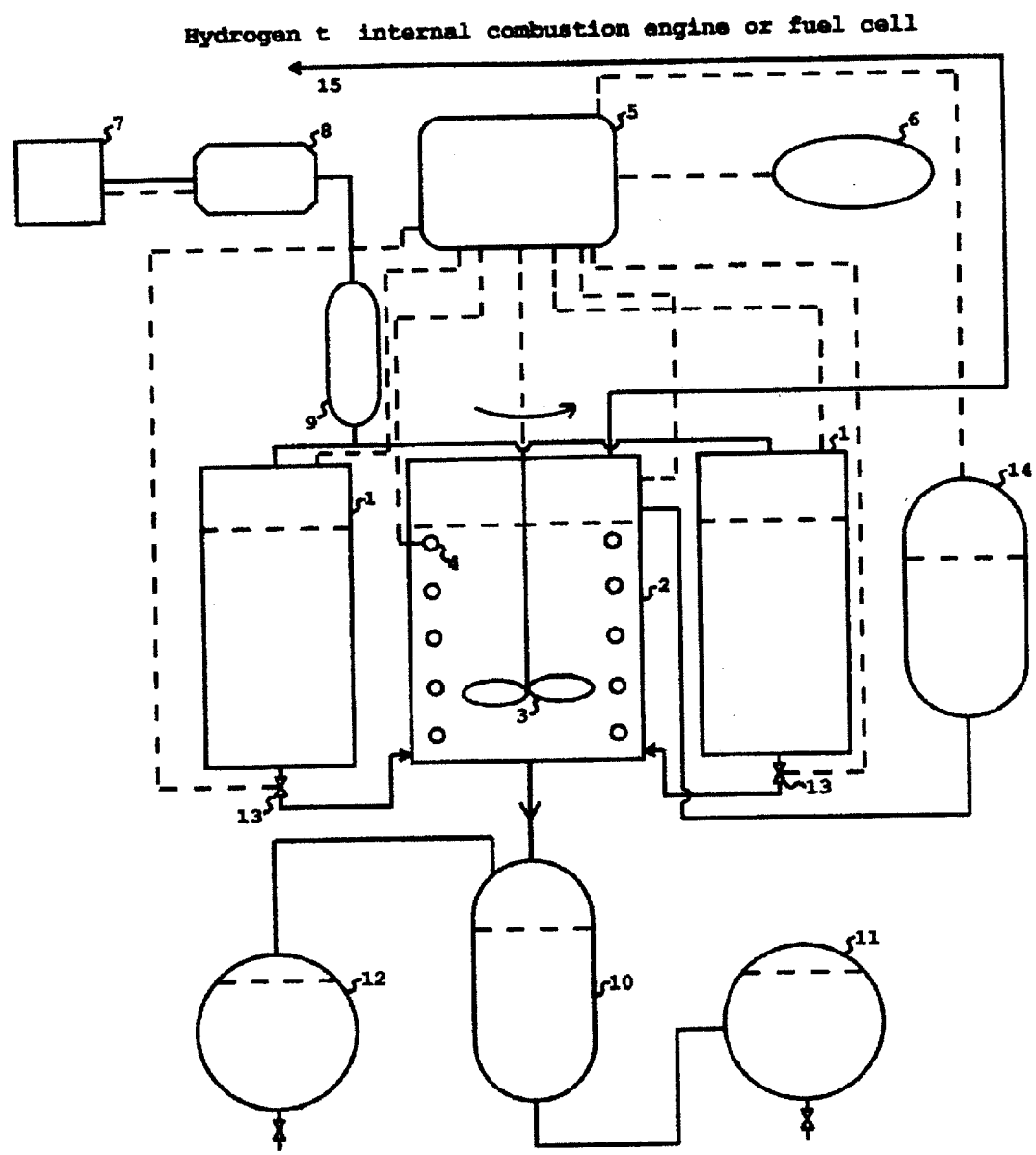
FIG. 1 illustrates the flow diagram of the in-situ-hydrogen-generation system according to an embodiment of the present invention.

References will now be made in detail to the preferred embodiment of the method of the present invention. The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

As shown in FIG. 1, a set of metal emulsion cartridges 1 surround and connect to a reactor tank 2, through solenoid delivering valves 13. The set of cartridges 1 may be in a group of about 6 to 12 cartridges. All metal-emulsion cartridges 1 are connected to the compressed air reservoir 8 through a desiccator 9. The pressurized air is supplied by a compressor 7. The reactor tank 2 is also connected to a fresh water tank 14 and a waste separation tank 10 in which the waste stream is separated into two layers. The upper layer bleeds into the waste oil storage 12 and aqueous products discharge into an aqueous waste storage tank 11.

The whole hydrogen generating system is managed by a microprocessor 5. The operating status and conditions are indicated on a liquid crystal display (LCD) 6. The compressed air reservoir 8 and each of the cartridges 1 has a pressure sensor. Each of the metal-oil emulsion cartridges 1 has a level sensor. The microprocessor 5 collects and processes the signals from all pressure sensors and then issues commands to all parts of the system, as shown through the dotted lines.

The method of operation of an embodiment of the system is described by the following. When the engine is starting or running, a suction is building up in the hydrogen delivering line 15, and the pressure in the reactor tank 2, is lowered. This is so, since the pressure above the metal-oil emulsion cartridge in use is in equilibrium with that in the compressed air reservoir 8, which is kept constant with a pressure controller (not shown). The pressurized air is supplied by compressor 7. Before entering the cartridge, the pressurized air is dried by passing through a desiccator 9. The flow rate of metal-oil emulsion from the cartridge into the reactor is proportional to the pressure difference between the cartridge in use and the reactor. This pressure difference varies proportionally with the engine's starting, idling and acceleration. For example, when the engine is running from idling to acceleration, the hydrogen pressure in the reactor is progressively decreased, and the rate of flow of metal-oil emulsion is proportionally increased.

The stirrer 3 in the reactor tank 2 provides a vigorous mixing effect to break up the metal-oil emulsion and to promote complete rapid reaction between the fuel metal and water or hydroxide solution. Thus, the complete utilization of the fuel metal is insured.

The microprocessor 5 continuously keeps track of the metal-emulsion content (through level measurement) of the cartridge in use. When the cartridge in use is exhausted, it closes the delivery valve 13 of the cartridge in use, at the same time, it opens the delivering valve 13 of the next unused cartridge in sequence until the cartridge bank is used up. The microprocessor 5 also sends the status information about the metal-emulsion content to the LCD display screen 6. It also issues a warning signal and/or emits an audible warning sound to alert the automobile driver or the engine operator to prepare for a refill. The cartridge bank is built as one unit, which can be easily disconnected from and reattached to the system. The system can be installed on board an automobile or motor vehicle having a hydrogen powered internal combustion engine.

The metal emulsion supplied to the cartridges is comprised of metal fuel and oil. The metal fuel is preferably in the form of a powder of finely divided iron, aluminum or alkali metals. Such metals may include finely divided sodium, potassium, magnesium or zinc. The size of the metal fuel powder may range from 25 to 500 microns. The oil comprises a high boiling point hydrocarbon or a vegetable oil. The preferred embodiment uses a hydrocarbon oil with a boiling point above 300 degrees F. Such a hydrocarbon oil provides for stability and long shelf life. The combined metal-oil emulsion may contain from about 25% to 75% of metal by weight. The preparation of the metal powder occurs immediately before its combination with oil to produce to the emulsion so as to minimize the possible contamination of the metal by air and water vapor. Once combined, the emulsion may resemble a paste-like consistency. The metal emulsion is stored in a bank of cartridges comprising about 6 to 12 cartridges to surround the reactor tank 2. The metal-oil emulsion is supplied to the reactor tank 2 in combination with water or alkali hydroxide solutions. For instance, sodium, potassium, zinc or magnesium based metal emulsions are reacted with water, whereas aluminum or iron based emulsions are reacted with an alkali hydroxide solution.

The reaction temperatures for reacting potassium and sodium for example with water ranges between the freezing point and the boiling point of the water. As for aluminum and an alkali solution, the reaction temperatures can range between the melting point and the boiling point of the alkali solution. The melting and boiling points of such a solution are increased proportionately with the increase of the concentrations of the solution. The reaction of aluminum or iron with an alkali solution is normally a slow reaction, therefore an electric heater may be used to speed up the hydrogen generation for such reactions. The electric heater can be used to bring about the reaction at a predetermined and desirable rate to sustain the power generation in a fuel cell or hydrogen burning internal combustion engine. During reaction, the reaction tank temperature and thus the generated hydrogen may be controlled at a constant temperature by providing a variable speed blower to remove excess heat generated by the reaction tank. The reaction tank may be installed with cooling fins to radiate off the excess heat. The speed of the blower may be controlled by microprocessor as described above. The resulting pure hydrogen is generated at a high rate at or near room temperature. Although preferred at or near room temperature, the generation of the pure hydrogen need not occur at such a temperature. The resulting method and system generates pure hydrogen without generation of any secondary gaseous products.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. A method for generating portable hydrogen fuel on-demand for a hydrogen powered internal combustion engine comprising:
   a. reacting water or alkali hydroxide solution with a metal in a reaction tank, the metal being in the form of a metal-oil emulsion;
   b. storing the metal-oil emulsion in a set of cartridges connected to and around the reaction tank, each cartridge having a solenoid delivering valve to deliver a flow of emulsion into the reaction tank;
   c. supplying compressed air to the system through a compressor to control pressure in the set of cartridges;
   d. drying the compressed air through a desiccator;
   e. collecting an oil and aqueous waste into a waste separating tank from the reacting step, whereby aqueous waste is collected in an aqueous waste tank and oil waste is collected in a waste oil tank; and
   f. controlling the system with a microprocessor, which controls timely opening and closing of the delivering valves in each of the cartridges in a sequence and continuously tracks metal-oil emulsion content and supply;
   wherein oily waste is continuously separated from the aqueous waste and bled into the waste oil tank from the reacting step, and pure hydrogen is generated at or near room temperature.

2. The method according to claim 1, wherein the metal-oil emulsion consists of a metallic powder comprising:
   finely divided sodium, potassium, magnesium or zinc, when reacted with water or
   aluminum powder or iron powder, when reacted with alkali hydroxide solution and
   wherein the size of the metallic powder ranges from about 25 to about 500 microns.

3. The method according to claim 2, wherein the emulsion comprises between 25% to 75% of metal by weight.

4. The method according to claim 1, wherein a metallic powder in the said metal emulsions is prepared just before the making of the metal-oil emulsion to minimize possible contamination by air and water vapor.

5. The method according to claim 1, wherein the oil in the metal-oil emulsion is a high boiling point hydrocarbon oil (above 300 degrees F.) or a vegetable oil.

6. The method according to claim 1, further comprising stirring within the reaction tank with a stirrer to promote a rapid and complete reaction between the metal and water or between the metal and alkali hydroxide solution.

7. The method according to claim 1, wherein the emulsion has a consistency comparable to that of a paste.

8. The method according to claim 1, further comprising:
   supplying a smooth and steady flow of the metal emulsion into the reaction tank,
   regulating the flow by the pressure difference between a cartridge in use and the reaction tank,
   controlling the pressure in the cartridge by a pressure controller attached to a compressed air reservoir supplied by a compressor;
   wherein when the engine is stopping, the pressure of hydrogen in the reaction tank builds up to equal that of the metal emulsion cartridge, resulting in no flow of metal emulsion;
   wherein when the engine is running from idle to acceleration, the hydrogen pressure in the reaction tank progressively reduces, and the rate of flow of metal emulsion is proportionally increased.

9. The method according to claim 1, further comprising sending information to a liquid crystal display.

10. The method according to claim 1, further comprising collecting information of pressures in the system and levels of metal-oil emulsion remaining in cartridges through a set of pressure and level sensors, and
    managing such information by a software program,
    wherein the microprocessor facilitates collecting and managing the information.

11. The method according to claim 1, further comprising heating the reaction tank with an electric heater in the case where the metal used is aluminum or iron wherein the temperature of the reaction tank is controlled by the microprocessor to maintain an optimal setting between room temperature and 250 degrees C.

12. The method according to claim 1, further comprising removing excess heat generated by the reaction tank by a variable speed blower to keep the temperature of the reaction tank constant, and the speed of the blower is controlled by the microprocessor.

13. The method according to claim 12, wherein removing excess heat from the reaction tank is further facilitated by installing cooling fins to the reaction tank.

14. The method according to claim 1, wherein the system is installed on board an automobile or motor vehicle having a hydrogen powered internal combustion engine.

15. A portable hydrogen-on-demand-generating system for a hydrogen powered internal combustion engine comprising:
   a. a reaction tank for reacting water or alkali hydroxide solution with a metal, the metal being in the form of a metal-oil emulsion;
   b. a set of cartridges connected to and around the reaction tank for storing the metal-oil emulsion, each cartridge having a solenoid delivering valve to deliver a flow of emulsion into the reaction tank;
   c. a compressor to control pressure in the set of cartridges and for supplying compressed air to the system;
   d. a desiccator to dry the compressed air before entering the cartridges;
   e. a waste separating tank for collecting an oil and aqueous waste resulting from the reacting step, further having an aqueous waste tank for collecting aqueous waste and a waste oil tank for collecting oil waste; and
   f. a microprocessor for controlling and managing the system, the microprocessor controls timely opening and closing of the delivering valves in each of the cartridges in a sequence and continuously tracks metal-oil emulsion content and supply;

wherein oily waste is continuously separated from the aqueous waste and bled into the waste oil tank from the reacting step, and pure hydrogen is generated at or near room temperature.

16. The system according to claim 15, wherein the metal-oil emulsion consists of a metallic powder comprising finely divided sodium, potassium, magnesium or zinc, when reacted with water or aluminum powder or iron powder, when reacted with alkali hydroxide solution and wherein the size of the metallic powder ranges from about 25 to about 500 microns and wherein the emulsion comprises between 25% to 75% of metal by weight.

17. The system according to claim 15, wherein a metallic powder in the said metal emulsions is prepared just before the making of the metal-oil emulsion to minimize possible contamination by air and water vapor.

18. The system according to claim 15, further comprising a stirrer for stirring within the reaction tank to promote a rapid and complete reaction between the metal and water or between the metal and alkali hydroxide solution.

19. The system according to claim 15, further comprising a pressure controller attached to a compressed air reservoir supplied by a compressor to control the pressure in a cartridge in use wherein a smooth and steady supply of the metal emulsion flow enters the reactor tank, regulated by the pressure difference between a cartridge in use and the reaction tank, wherein when the engine is stopping, the pressure of hydrogen in the reactor tank builds up to equal that of the metal emulsion cartridge, resulting in no flow of metal emulsion;

wherein when the engine is running from idle to acceleration, the hydrogen pressure in the reactor tank progressively reduces, and the rate of flow of metal emulsion is proportionally increased.

20. The system according to claim 15, further comprising a set of pressure and level sensors for providing pressure and metal-oil emulsion level information to the microprocessor a set of pressure and level sensors for providing pressure and metal-oil emulsion level information to the microprocessor;

a software program to manage such information; and a liquid crystal display for providing such information to an end-user.

21. The system according to claim 15, further comprising an electric heater for heating the reaction tank in the case where the metal used is aluminum or iron wherein the temperature of the reaction tank is controlled by the microprocessor to maintain an optimal setting between room temperature and 250 degrees C.

22. The system according to claim 15, further comprising a variable speed blower for removing excess heat generated by the reaction tank, to keep the temperature of the reaction tank constant, and wherein the speed of the blower is controlled by the microprocessor.

23. The system according to claim 22, further comprising cooling fins attached to the reaction tank for facilitating removal of excess heat from the reaction tank.

* * * * *